(12) United States Patent
Osakabe et al.

(10) Patent No.: US 12,160,553 B2
(45) Date of Patent: Dec. 3, 2024

(54) PRINTING DEVICE, AND NON-TRANSITORY COMPUTER-READABLE RECORDING MEDIUM THEREFOR

(71) Applicant: Brother Kogyo Kabushiki Kaisha, Nagoya (JP)

(72) Inventors: Yoshinori Osakabe, Seto (JP); Sosuke Kuroyanagi, Nishio (JP); Masahiro Hoga, Ogaki (JP); Hiroyuki Ishikawa, Nisshin (JP); Jun Morikawa, Nagoya (JP); Taichi Shirono, Nagoya (JP); Fumio Nakazawa, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 17/809,609

(22) Filed: Jun. 29, 2022

(65) Prior Publication Data
US 2023/0001705 A1 Jan. 5, 2023

(30) Foreign Application Priority Data
Jun. 30, 2021 (JP) ................. 2021-108551

(51) Int. Cl.
B41J 29/393 (2006.01)
B41J 2/175 (2006.01)
B41J 2/21 (2006.01)
H04N 1/401 (2006.01)
H04N 1/60 (2006.01)

(52) U.S. Cl.
CPC .......... *H04N 1/603* (2013.01); *B41J 2/17566* (2013.01); *B41J 2/2128* (2013.01); *H04N 1/4015* (2013.01); *H04N 1/6019* (2013.01); *B41J 2002/17589* (2013.01)

(58) Field of Classification Search
CPC .......... B41J 2/17566; B41J 2002/17589; B41J 2/2128
See application file for complete search history.

(56) References Cited

U.S. PATENT DOCUMENTS
2020/0282743 A1   9/2020   Maehira et al.

FOREIGN PATENT DOCUMENTS
JP   S55-65560 A    5/1980
JP   3988401 B2  * 10/2007   .......... B41J 2/17566
JP   2020-147039 A  9/2020

* cited by examiner

*Primary Examiner* — Julian D Huffman
(74) *Attorney, Agent, or Firm* — Scully, Scott, Murphy & Presser, P.C.

(57) ABSTRACT

A printing device is provided with a print head having a plurality of nozzles configured to eject ink droplets therefrom, a supplier configured to supply ink contained in a container to the print head, and a controller. The controller is configured to perform obtaining ink information having correlation with a height of a liquid surface of the ink contained in the container, obtaining subject image data representing an image to be printed, generating print data based on the subject image data, and causing the print head to eject ink droplets based on the print data. The generating includes adjusting the print data in accordance with the ink information.

15 Claims, 11 Drawing Sheets

THIRD EMBODIMENT

| LIQUID LEVEL | | | | PROFILE TO BE SELECTED |
|---|---|---|---|---|
| C | M | Y | K | |
| HIGH | HIGH | HIGH | HIGH | NORMAL PROFILE |
| LOW | HIGH | HIGH | HIGH | ADJUSTED PROFILE 1 |
| HIGH | LOW | HIGH | HIGH | ADJUSTED PROFILE 2 |
| HIGH | HIGH | LOW | HIGH | ADJUSTED PROFILE 3 |
| HIGH | HIGH | HIGH | LOW | ADJUSTED PROFILE 4 |
| LOW | LOW | HIGH | HIGH | ADJUSTED PROFILE 5 |
| LOW | HIGH | LOW | HIGH | ADJUSTED PROFILE 6 |
| LOW | HIGH | HIGH | LOW | ADJUSTED PROFILE 7 |
| HIGH | LOW | LOW | HIGH | ADJUSTED PROFILE 8 |
| HIGH | LOW | HIGH | LOW | ADJUSTED PROFILE 9 |
| HIGH | HIGH | LOW | LOW | ADJUSTED PROFILE 10 |
| LOW | LOW | LOW | HIGH | ADJUSTED PROFILE 11 |
| LOW | LOW | HIGH | LOW | ADJUSTED PROFILE 12 |
| LOW | HIGH | LOW | LOW | ADJUSTED PROFILE 13 |
| HIGH | LOW | LOW | LOW | ADJUSTED PROFILE 14 |
| LOW | LOW | LOW | LOW | ADJUSTED PROFILE 15 |

FIG. 8

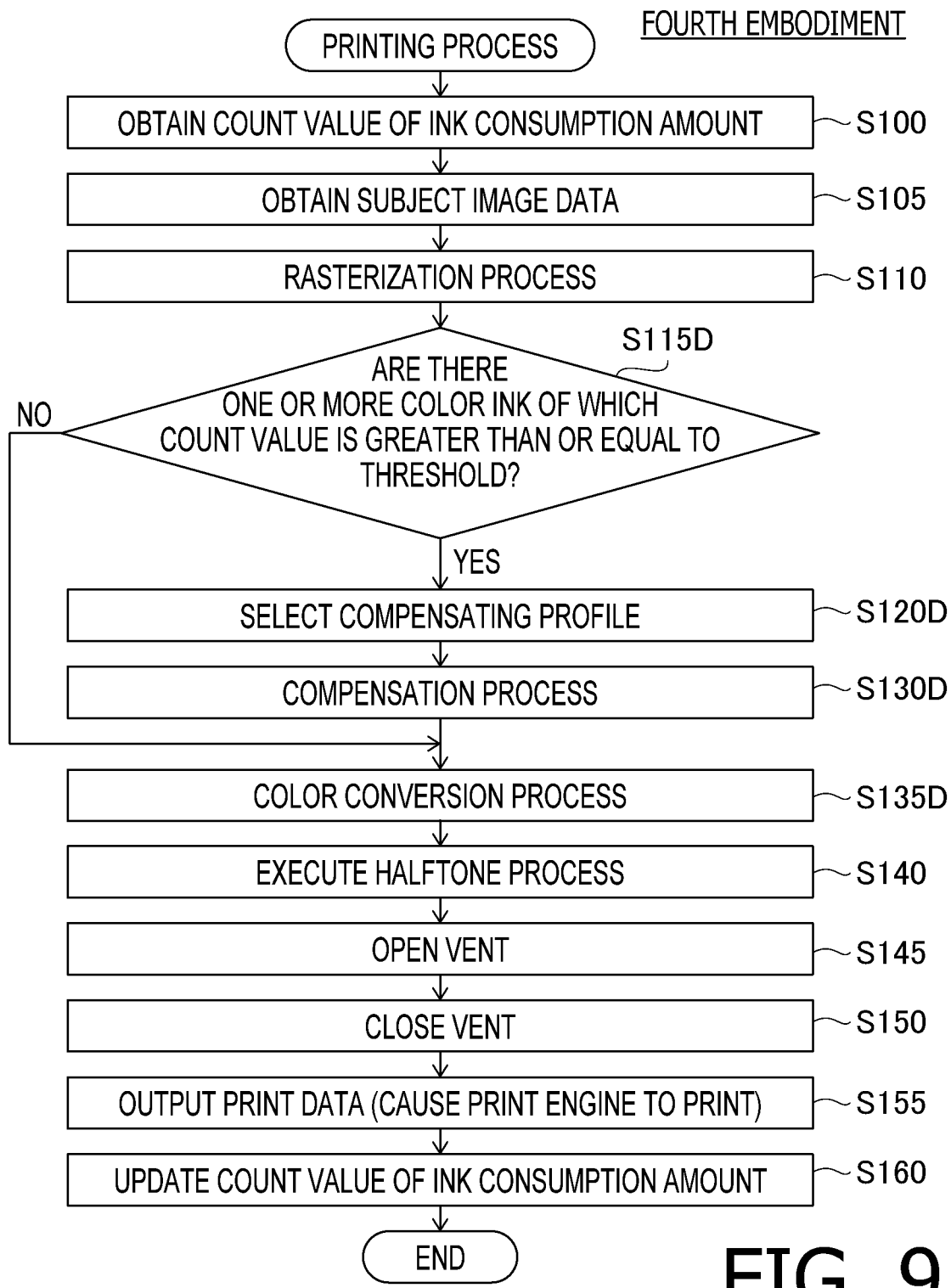

PRINTING DEVICE, AND NON-TRANSITORY COMPUTER-READABLE RECORDING MEDIUM THEREFOR

REFERENCE TO RELATED APPLICATIONS

This application claims priority from Japanese Patent Application No. 2021-108551 filed on Jun. 30, 2021. The entire content of the priority application is incorporated herein by reference.

BACKGROUND ART

The present disclosures relate to controlling of a print engine which includes a print head having nozzles configured to eject ink droplets, and an ink supplier configured to supply ink contained in an ink container to the print head.

There has been known an inkjet pen which is configured to eject ink from nozzles formed on an inkjet head to print an image. Typically, the inkjet pen is configured such that an ink cartridge containing ink is arranged above the inkjet head, and the ink is supplied from the ink cartridge to the inkjet head through a pipe connecting both.

DESCRIPTION

In printing devices employing an inkjet method, as a height of a surface of the ink contained in the ink cartridge varies with ink consumption, a water head difference between a nozzle meniscus and the ink surface in the ink cartridge varies. When the water head difference fluctuates, the pressure at the nozzles changes.

If the same discharge control is maintained regardless of the change in the pressure at the nozzles, the amount of ink discharged from the nozzles is changed.

When the amount of the ink ejected from the nozzles varies due to fluctuations in the water head difference, the density of the image printed by the printing device could fluctuate.

According to aspects of the present disclosures, there is provided a printing device, which is provided with a print head having a plurality of nozzles configured to eject ink droplets therefrom, a supplier configured to supply ink contained in a container to the print head, and a controller. The controller is configured to perform obtaining ink information having correlation with a height of a liquid surface of the ink contained in the container, obtaining subject image data representing an image to be printed, generating print data based on the subject image data, and causing the print head to eject ink droplets based on the print data. The generating includes adjusting the print data in accordance with the ink information.

According to aspects of the present disclosures, there is provided a printing device, which is provided with a print head having a plurality of nozzles configured to eject ink droplets therefrom, a supplier configured to supply ink contained in a container to the print head, and a controller. The controller is configured to perform obtaining ink information having correlation with a height of a liquid surface of the ink contained in the container, obtaining subject image data representing an image to be printed, generating print data based on the subject image data, and causing the print head to eject ink droplets based on the print data. The generating includes adjusting the print data, based on the ink information, such that the lower the height of the liquid surface of the ink is, the more an ejection amount of the ink is.

According to aspects of the present disclosures, there is provided a non-transitory computer-readable recording medium for a printing device having a print head having a plurality of nozzles configured to eject ink droplets therefrom, a supplier configured to supply ink contained in a container to the print head, and a controller. The non-transitory computer-readable recording medium contains computer-executable instructions which cause, when executed by the controller, the printing device to perform obtaining ink information having correlation with a height of a liquid surface of the ink contained in the container, obtaining subject image data representing an image to be printed, generating print data based on the subject image data, and causing the print head to eject ink droplets based on the print data, the generating including adjusting the print data in accordance with the ink information.

According to the above configuration, the print data is adjusted according to information that correlates with the height of the liquid surface of the ink, thereby preventing fluctuations in the actually printed image caused by the difference in hydraulic head between the nozzle meniscus and the liquid surface of the ink in the container.

FIG. 1 is a block diagram showing a functional configuration of a printer according to an embodiment.

FIG. 2A schematically shows a configuration of a print engine.

FIG. 2B schematically shows an arrangement of nozzles.

FIG. 8 illustrates a selection of color conversion profiles.

FIG. 9 is a flowchart illustrating a printing process according to a fourth embodiment.

FIRST EMBODIMENT

Configuration of Printer

Referring to accompanying drawings, embodiments and modifications will be described.

Figure 1:
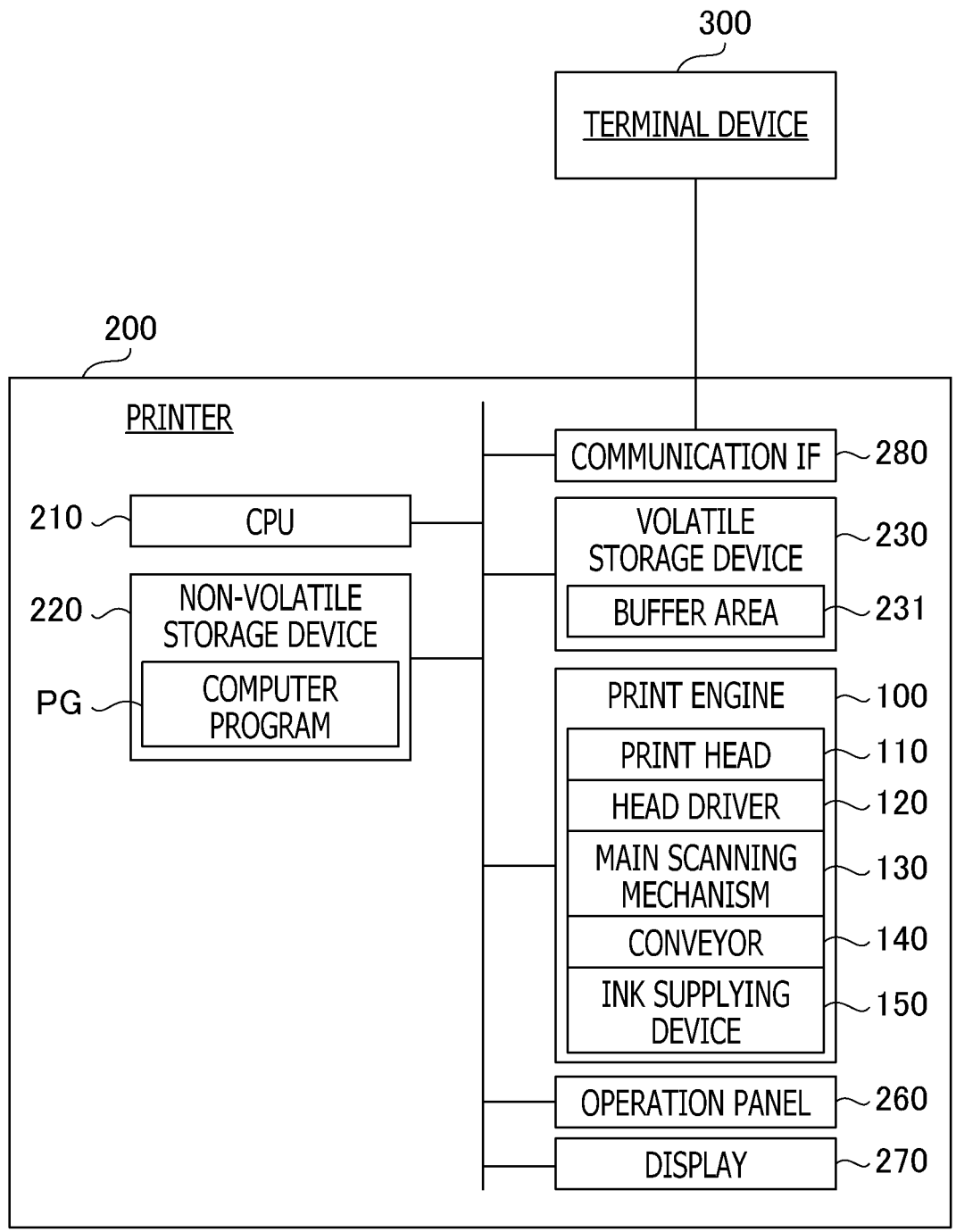

FIG. 1 is a block diagram showing a configuration of a printer 200 according to an embodiment of the present disclosures.

The printer 200 has, for example, a print engine 100, a CPU 210 as a control unit for the print engine 100, a non-volatile storage device 220 such as a hard disk drive or a flash memory, a volatile storage device 230 such as a RAM, and an operation panel 260 provided with buttons and/or a touch panel for obtaining operations by a user, a display 270 such as a liquid crystal display, a communication interface 280. The printer 200 is connected to an external device, such as a user's terminal device 300 via the communication interface 280.

The volatile storage device 230 provides a buffer area 231 which is used to temporarily store various intermediate data generated when the CPU 210 executes various processes. In the non-volatile storage device 220, a computer program PG is stored. The computer program PG according to the present disclosures is a control program configured to control operations of the printer 200. The computer program PG may be provided as stored in the non-volatile storage device 220 when the printer 200 is shipped from a factory. Alternatively, the computer program PG may be provided so as to be downloaded from a server, or in a form of a DVD-ROM storing the program PG. By executing the program PG, the CPU 210 executes processes, for example, a printing process (described later), to control the print engine 100 to perform printing.

The print engine 100 is configured to perform printing by ejecting ink Ik of each of the colors of cyan (C), magenta (M), yellow (Y) and black (K). In the following description, the cyan ink, the magenta ink, the yellow ink, the black ink will be referred to as C ink, M ink, Y ink and K ink, respectively, using the above-explained capital letters. The print engine 100 has a print head 110, a head driver 120, a main scanning mechanism 130, a conveyor 140, and an ink supplying device 150.

Figure 2A:
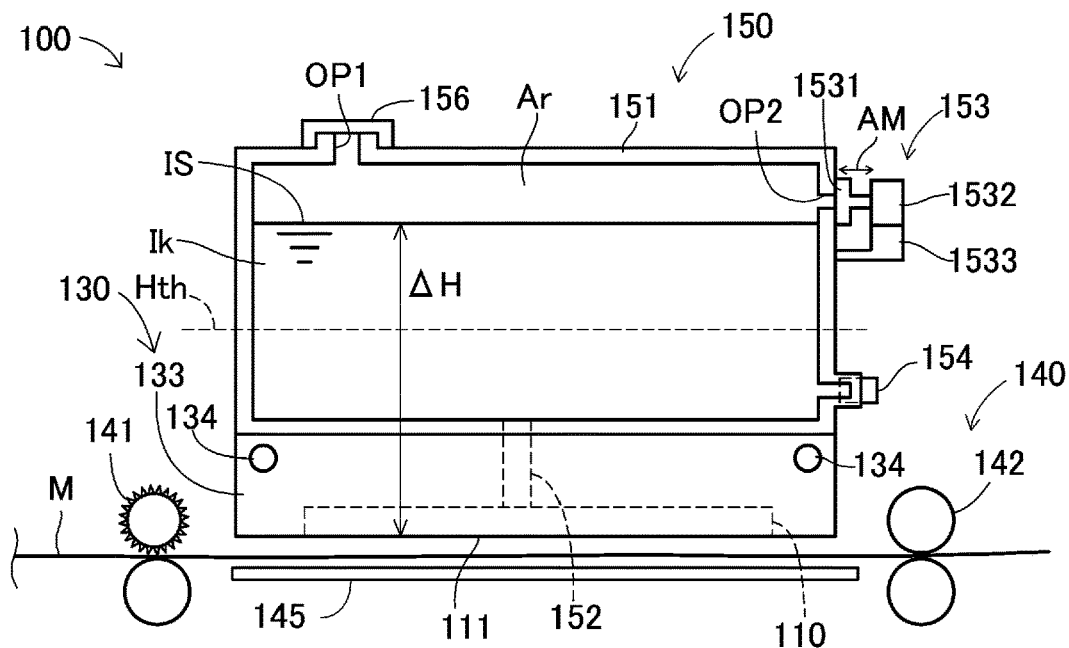
Figure 2B:
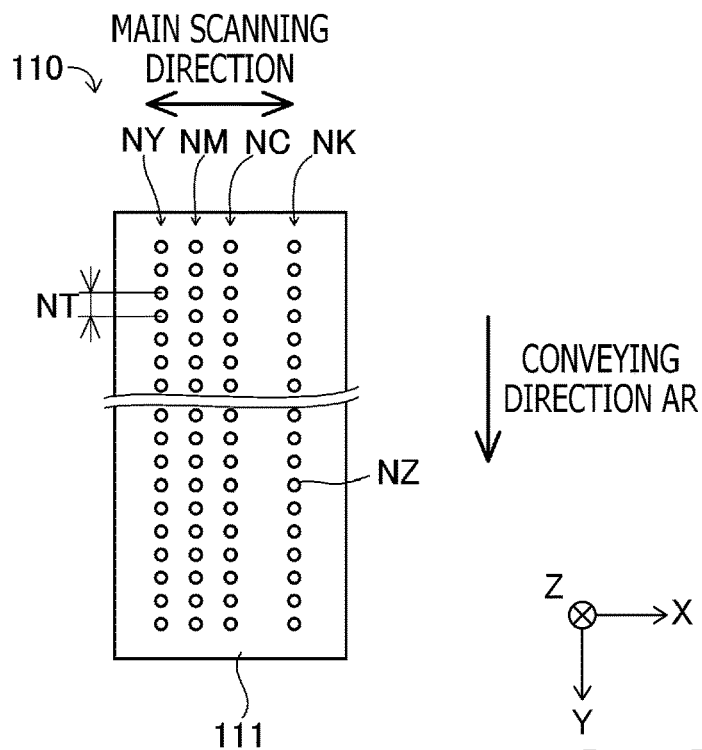

FIGS. 2A and 2B show a schematic configuration of the print engine 100. As shown in FIG. 2A, the main scanning mechanism 130 includes a carriage 133 mounting the print head 110, a slider shaft 134 configured to slidably support the carriage 133 so that the carriage 133 moves reciprocally in a main scanning direction, which is an X-axis direction indicated in FIGS. 2A and 2B. The main scanning mechanism 130 is configured to move the carriage 133 along the slider shaft 134 using a driving force of a main scanning motor (not shown). In this way, the main scanning to reciprocate the print head 110 along the main scanning direction with respect to a sheet M is realized.

The conveyor 140 conveys the sheet M in a conveying direction AR (i.e., a Y-axis direction in FIGS. 2A and 2B) which intersects with the main scanning direction, with holding the sheet M. As shown in FIG. 2A, the conveyor 140 includes a sheet table 145, an upstream roller pair 142, and a downstream roller pair 141. In the following description, an upstream side in the conveying direction AR (i.e., −Y side) will be simply referred to as an upstream side, and a downstream side in the conveying direction (i.e., +Y side) will be simply referred to as a downstream side.

The upstream roller pair 142 holds the sheet M on the upstream side (−Y side) relative to the print head 110, and the downstream roller pair 141 holds the sheet M on the downstream side (+Y side) relative to the print head 110. The sheet table 145 is located at a position between the upstream roller pair 142 and the downstream roller pair 141, and at a position facing a nozzle surface 111 of the print head 110. As the downstream roller pair 141 and the upstream roller pair 142 are driven by the not-shown conveying motor, the sheet M is conveyed in the conveying direction.

The ink supplier 150 has, for each of the CMYK inks Ik, an ink container 151, an ink channel 152, a valve mechanism 153, and a liquid level sensor 154. In FIG. 2A, to avoid complications in the drawing, for one color of ink Ik, the ink container 151, the ink channel 152, the valve mechanism 153, and the liquid level sensor 154 are shown. Actually, for each of the four CMYK inks Ik, the components 151-154 are aligned in the X-axis direction.

The ink container 151 contains the ink Ik inside. The ink container 151 is mounted on the carriage 133 and is located above (i.e., on +Z side) the print head 110. Therefore, according to the present embodiment, the entire ink contained in the ink container 151 is located on an upper side (i.e., a higher side) relative to the nozzle surface 111 of the print head 110.

On an upper wall of the ink container 151, an inlet OP1 for injecting the ink into the ink container 151 is formed. The inlet OP1 is usually fitted with a lid 156 and is kept closed thereby. When the ink Ik is injected, the lid 156 is removed and the ink Ik is injected from a bottle through the inlet OP1.

On an upper part of a side wall of the ink container 151, a vent OP2 is formed. The vent OP2 is formed to penetrate the side wall of the ink container 151.

The valve mechanism 153 is configured to open and close the vent OP2 in accordance with the control of the CPU 210. A state where the vent OP is opened is a state where the inside of the ink container 151 and the outside of the ink container 151 communicate with each other via the vent OP2 (which will also be referred to as a communicating state). A state where the vent OP is closed is a state where the inside of the ink container 151 and the outside of the ink container 151 do not communicate with each other (which will also be referred to as a non-communicating state). The valve mechanism 153 is, for example, a known electromagnetic valve provided with a valve 1531 and a solenoid 1532.

The solenoid 1532 is attached to the side wall of the ink container 151 via a supporting table 1533. The valve 1531 is supported by the solenoid 1532. The valve 1531 is configured to move in a right-left direction (i.e., the Y-axis direction) as indicated by arrow AM by a driving force generated by the solenoid 1532. For example, when an electrical current does not flow in the solenoid 1532, the valve 1531 contacts the vent OP2 to close the same. On the other hand, when the electrical current is flowing in the solenoid 1532, the valve 1531 is separated from the vent OP2, thereby opening the vent OP2.

The liquid level sensor 154 is attached to the lower side of the side wall of the ink container 151. The liquid level sensor 154 is configured to detect whether or not the surface IS of the ink Ik inside ink container 151 is equal to or lower than a particular height in accordance with the control of the CPU 210. For example, the particular height is the height at which the liquid sensor 154 is attached to the ink container 151, which is the height corresponding to an amount of the ink Ik at which the ink Ik is to be supplied. In other words, the particular height corresponds to an empty level or near-empty level of the ink Ik. As the liquid level sensor 154, a known sensor employing a method of measuring electrical resistance or light transmission at the particular height may be used.

The ink channel 152 is a flow path for supplying the ink Ik contained in the ink container 151 to the print head 110. An upper end of the ink channel 152 communicates with a bottom surface of the ink container 151, while a lower end of the ink channel 152 communicates with an internal flow path (not shown) of the print head 110.

There are known ink containers for printers that are equipped with a structure (e.g., a structure using a porous material or a negative pressure valve) to maintain the air pressure inside the container at a pressure less than atmospheric pressure (negative pressure). The ink container (container) 151 according to the present embodiment is not equipped with a structure to maintain the pressure of the air layer Ar at a negative pressure.

FIG. 2B illustrates a configuration of the print head 110 viewed from the −Z side (i.e., from the lower side in FIG. 2A). As shown in FIG. 2B, the nozzle surface 111 of the print head 110 is formed with a plurality of rows of nozzles, i.e., nozzle rows NC, NM, NY, and NK for ejecting the above-described C, M, Y and K inks Ik. Each nozzle row contains a plurality of nozzles NZ aligned along the conveying direction AR. The plurality of nozzles NZ in each row are arranged such that positions thereof in the conveying direction AR (i.e., +Y direction) are different from each other, and are arranged at a particular nozzle interval NT along the conveying direction AR.

The positions of the nozzle rows NC, NM, NY, and NK in the main scanning direction (FIG. 2B) differ from each other, and the positions of nozzles between multiple nozzle rows in the conveying direction AR (i.e., the Y direction in FIG. 2B) overlap each other. In the example shown in FIG. 2B, in the +X direction of the nozzles of the nozzle row NY configured to eject the Y ink, the nozzles of the nozzle row NM configured to eject the M ink are arranged.

Each nozzle NZ is formed on the nozzle surface 111. Therefore, a vertical position of an aperture of each nozzle NZ (i.e., a position in the Z direction) is the vertical position of the nozzle surface 111. The internal flow path (not shown) inside the print head 110 is formed for each nozzle NZ. In each internal flow path, an actuator (e.g., a piezoelectric element, not shown) causing the internal path to deform to eject the ink Ik from the nozzle NZ is provided.

The head driver 120 (see FIG. 1) is configured to provide a drive signal to each actuator of the print head 110 when the main scanning mechanism 130 executes the main scanning of the print head 110. Thus, the ink Ik is ejected from each nozzle NZ of the print head 110 onto the sheet which is conveyed by the conveyor 140 in the conveying direction AR, thereby dots of ink Ik being formed two-dimensionally on the sheet M.

A difference between the height of the liquid level IS of ink Ik in the ink container 151 and the height of aperture of the nozzle NZ is referred to as a water head difference ΔH (FIG. 2A). A convex or concave surface of the ink Ik, referred to as a meniscus, is formed at the aperture of the nozzle NZ. The pressure exerted from the above on the meniscus of the aperture of the nozzle NZ includes a water head pressure and an in-container atmospheric pressure. The water head pressure is the pressure resulting from the weight of the ink Ik. The water head pressure varies with the water head difference ΔH, and the larger the water head difference ΔH, the greater the water head pressure. The in-container atmospheric pressure is the air pressure in the air layer Ar above the liquid level IS in the ink container 151. As printing is performed by the print engine 100 and ink Ik is consumed, the liquid level IS is lowered. Because the water head difference ΔH decreases as the liquid level IS is lowered, the water head pressure decreases as the liquid level IS is lowered.

The print engine 100 uses the above-mentioned components 110-150 to execute printing. That is, the print engine 100 executes a partial printing to form dots on the sheet M with the print head 110 while the main scanning is executed by the main scanning mechanism 130, and a sub-scanning (i.e., conveyance of the sheet M) is executed by the conveyor 140 alternately, by a plurality of times, thereby an image being formed on a printing medium (e.g., the sheet M).

Printing Process

The CPU 210 of the printer 200 (see FIG. 1) executes the printing process based on printing instructions from the user, which are received, for example, via the operation panel 260. The print instruction includes a designation of image data representing the image to be printed.

Figure 3:
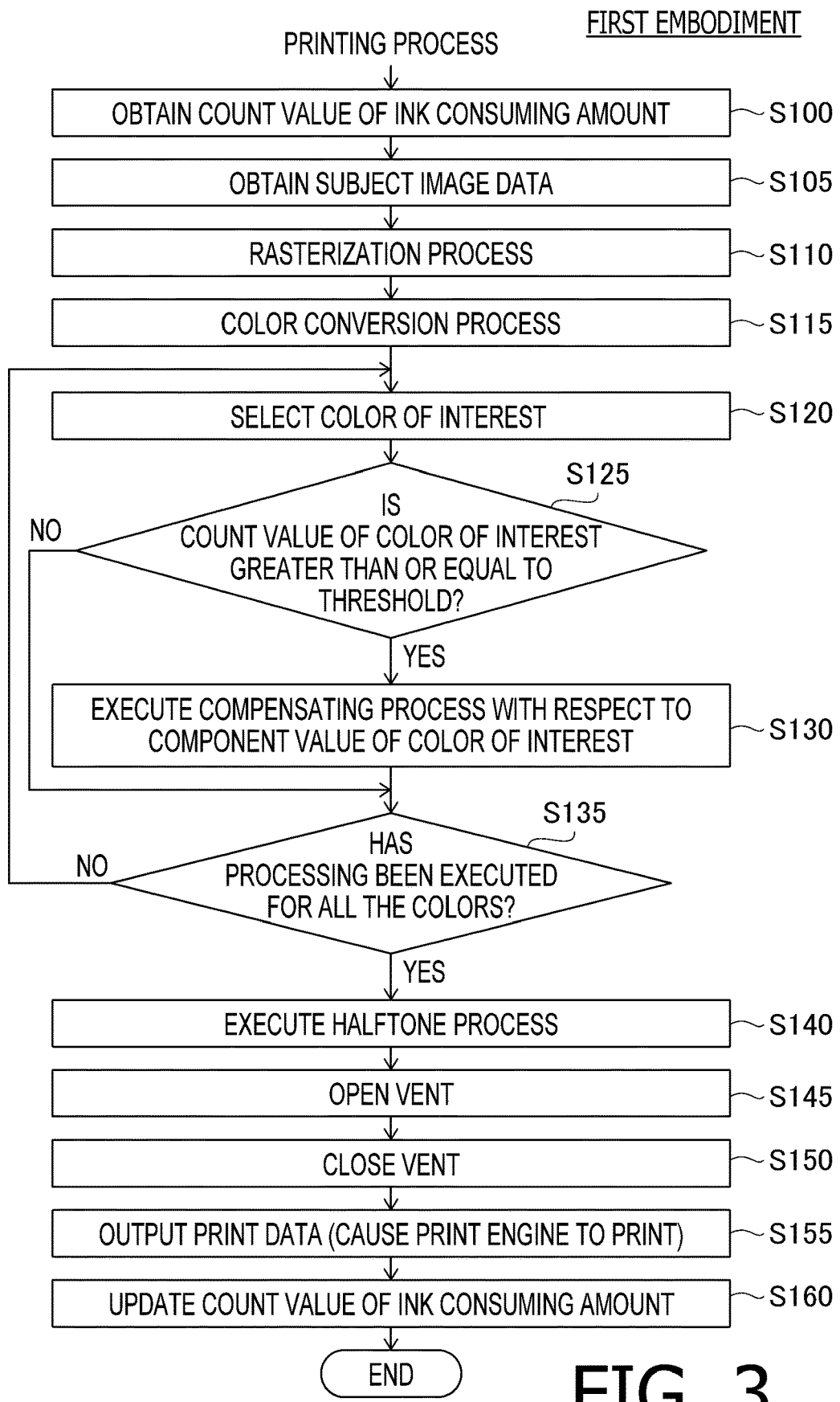
FIG. 3 is a flowchart illustrating a printing process according to a first embodiment.

FIG. 3 is a flowchart illustrating the printing process according to the first embodiment, which is executed by the CPU 210.

In S100, the CPU 210 obtains a count value CV which is a value related to a consumed amount of the ink Ik. It is noted that, in S100, the count value CV for each of the C, M, Y, K inks Ik is obtained. In the following description, the count values of the four colors of C, M, Y and K will also be expressed as count values CVc, CVm, CVy and CVk, respectively. These count values CVc, CVm, CVy, and CVk are recorded, for example, in the non-volatile storage device 220. When there is no need to distinguish the count values CVc, CVm, CVy and CVk from each other for the purpose of description, the count value is simply referred to as a count value CV.

Each time the printing is performed, a number corresponding to the amount of ink consumed in the printing is added to the count value CV (S160, described below). The count value CV for a specific color (e.g., C (cyan)) is reset when ink Ik is refilled in the ink container 151 for ink Ik of the specific color. In the present embodiment, when the user inputs via the operation panel 260 that ink Ik of a specific color has been refilled, it is determined that the ink Ik of that specific color has been refilled. Thus, the count value CV is a value indicating the amount of ink consumed after the ink container 151 was refilled with the ink Ik.

Assuming that Vmax is the amount of ink in the ink container 151 when ink Ik is fully refilled, the remaining amount Vr of the ink Ik in the ink container 151 can be expressed as (Vmax−CV). The height of the liquid surface IS of the ink in the ink container 151 is uniquely determined by the remaining amount Vr of the ink in the ink container 151. Therefore, the count value CV of the ink consumption is information that correlates with the remaining amount Vr and the height of the liquid level IS.

In S105, the CPU 210 obtains subject image data. The subject image data is image data used for the printing process, and is designated by the print instruction. The subject image data is obtained from the external device or the volatile storage device 230. The subject image data is image data with any of various formats such as a format of JPEG-compressed image data, a format of image data described in a page description language.

In S110, the CPU 210 performs a rasterization process on the obtained target image data to generate RGB image data. The RGB image data is bitmap data containing RGB values for each pixel. The RGB value is, for example, a color value in the RGB color system that includes values for three components: red (R), green (G), and blue (B). In the following description, the R, G, and B component values are also referred to as R, G, and B values, respectively.

In S115, the CPU 210 performs a color conversion process on the RGB image data. The color conversion process is a process of converting the RGB values of multiple pixels constituting the raster line of interest to CMYK values. The CMYK value is a color value in the CMYK color system that includes the component values corresponding to the inks used for printing (in this embodiment, the C, M, Y, and K component values). The color conversion process is performed, for example, by referring to a known look-up table that defines the correspondence between RGB values and CMYK component values. In the following description, the C, M, Y, and K component values are also referred to as C, M, Y, and K values, respectively. By the color conversion process, CMYK image data containing CMYK values for each pixel is generated.

In S120, the CPU 210 selects, from among the four colors of CMYK, one color of interest. In S125, the CPU 210 determines whether the count value CV of the color of interest is greater than or equal to a threshold value CVth. It is noted that the threshold value CVth is the count value CV when the height of the liquid level IS of the ink container 151 is at the reference height Hth (see FIG. 2A). That is, the remaining amount Vrth of the ink Ik when the height of the liquid level IS of the ink container (container) 151 is Hth is (Vmax−CVth). As can be seen from the above description, determining whether or not the count value CV of the color of interest is greater than or equal to the threshold value CVth is equivalent to determining whether or not the height of the liquid level IS of the ink Ik of the color of interest is less than or equal to the reference height Hth.

If the count value CV of the color of interest is greater than or equal to the threshold value CVth (S125: YES), at S130, the CPU 210 executes a compensating process to increase the density for the component value of the color of interest. In other words, if the height of the liquid surface IS of the ink Ik of the color of interest can be determined to be less than or equal to the reference height Hth based on the count value CV, the compensating process is executed for the component values of the color of interest.

Figure 4:
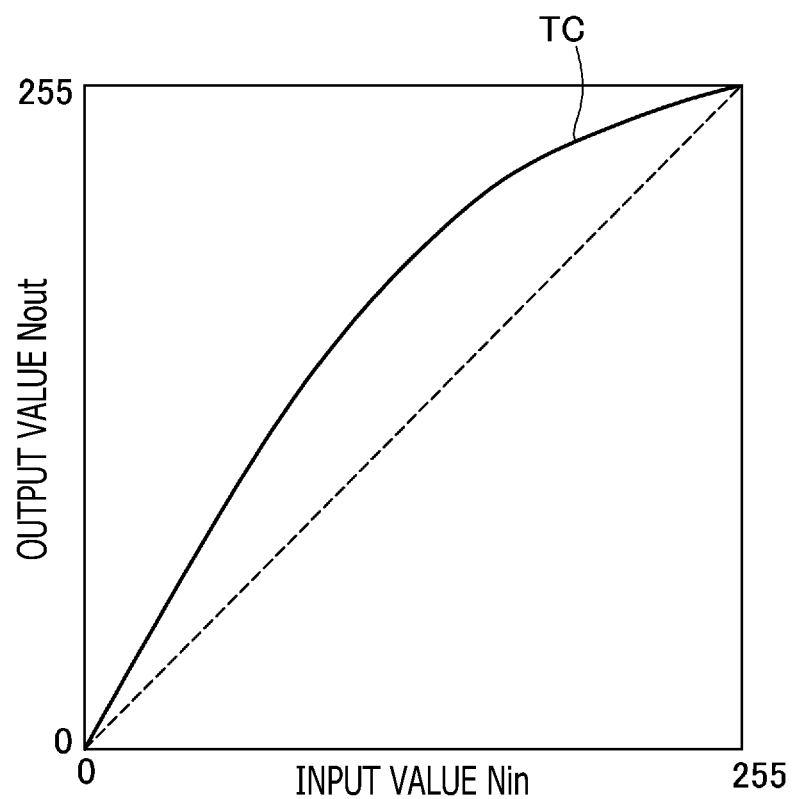
FIG. 4 is a graph schematically showing an example of a tone curve for a compensating process.

FIG. 4 shows an example of a tone curve for the compensating process. The tone curve TC in FIG. 4 defines the correspondence between an input value Nin and an output value Nout for a range of values (256 steps from 0 to 255 in this example) that can be taken by the component values of the color of interest (e.g., C and M values). The CPU 210 is configured to apply the tone curve TC in FIG. 4 to the component values of the color of interest from among the CMYK values of respective pixels contained in the CMYK image data. According to the tone curve TC in FIG. 4, except when the component values are 0 or 255, the component values after compensation are larger than the corresponding component values before correction, respectively.

When the count value CV of the color of interest is less than the threshold value CVth (S125: NO), the CPU 210 skips S130. In other words, when it is possible to determine, based on the count value CV, that the height of the liquid surface IS of the ink Ik of the color of interest is higher than the reference height Hth, no compensating process is performed for the component values of the color of interest.

In S135, the CPU 210 determines whether or not all the CMYK colors have been processed as the color of interest. When there are unprocessed colors (S135: NO), the CPU 210 returns to S120. When all the colors have been processed (S135: YES), then CPU 210 proceeds to S140.

In S140, the CPU 210 executes the halftone process on the CMYK image data to generate dot data. The dot data represents the dot forming status of each pixel for each of the CMYK color components. The value for each pixel in the dot data indicates, for example, the state of dot formation in two levels of "no dot" and "with dot," or in four levels of "no dot," "small," "medium," and "large." The halftone process is performed using known techniques such as a dithering process or an error diffusion process.

In S145, the CPU 210 controls the valve mechanism provided to the ink container 151 for each of the CMYK colors to open the vent OP2 of each ink container 151 closed by the valve 1531. In this way, the inside of each ink container 151 and the outside of each ink container 151 communicate with each other, and the air pressure in the air layer Ar of each ink container 151 becomes the atmospheric pressure.

In S150, the CPU 210 controls the valve mechanism 153 provided to the ink container 151 of each of the MMYK colors to close the vent OP2, which was opened in S145, with the valve 1531. In this way, for example, leakage of the ink Ik from the vent OP2 and/or entry of foreign matters into the ink container 151 from the vent OP2 can be suppressed.

In S155, the CPU 210 outputs the print data to the print engine 100 and causes the print engine 100 to execute printing. For example, the CPU 210 generates print data by rearranging the dot data in the order used for printing and adding control data such as print commands, and outputs the print data to the print engine 100. The print engine 100 prints images on the sheets according to the print data.

In S160, the CPU 210 updates the count value CV of each of the CMYK colors stored in the non-volatile storage device 220. For example, the CPU 210 calculates a consuming amount of the ink Ik of each of the CMYK colors based on the print data, and adds the calculated values to the count values of the ink Ik of the CMYK colors, respectively. When the count values CV are updated, the printing process is terminated.

According to the printing process in the above-described embodiment, the CPU 210 is configured to obtain the count values CV which are information correlated with the height of the liquid surface IS of the ink Ik contained in the ink container 151 (S100 of FIG. 3), obtain the subject image data (S105 of FIG. 3), executes the generation process to generate the print data based on the subject image data (S110-S140 of FIG. 3), and cause the print head 110 to eject the ink droplets based on the print data (S155 of FIG. 3). The process of generating the print data includes an adjustment process to adjust the print data according to the count value CV (S120-S130 in FIG. 3). As a result, the print data is adjusted according to the count value CV that is correlated with the height of the ink surface IS of the ink Ik. As a result, fluctuations in the image which would occur due to the water head difference ΔH between the meniscus of nozzles NZ and the liquid surface of the ink Ik in the ink container 151.

For example, since the density of the image represented by the print data is adjusted according to the height of the liquid surface IS of the ink Ik, fluctuations due to the water head difference ΔH between the meniscus of nozzle NZ and the liquid surface of the ink Ik in the ink container can be suppressed.

More details are explained below. The smaller the pressure applied from above to the meniscus of the nozzle NZ opening, the more difficult it is for the ink Ik to be ejected from the nozzle NZ. For this reason, when the actuators are driven using the same drive signal, the smaller the pressure applied to the meniscus from above, the less the amount of ink Ik for one dot ejected from the nozzle NZ. As the amount of ink Ik for one dot decreases, the size (area) of each dot that forms the printed image decreases, resulting in a decrease in the density of the printed image.

The lower the height of the liquid surface IS of the ink Ik is, the smaller the water head difference □H is, and the smaller the pressure applied to the meniscus from the above is. Therefore, when the height of the liquid surface IS is less than the reference height Hth (FIG. 2A), in comparison with the case where the height of the liquid surface IS is higher than the reference height Hth (FIG. 2A), the water head difference ΔH is small, and therefore, the area of each dot that forms the printed image is smaller, and the density of the printed image decreases.

In the present embodiment, when the height of the liquid surface IS is determined, based on the count value CV, to be less than or equal to the reference height Hth (S125: YES), a correction process to increase the density of the color of interest in the image represented by the print data (hereinafter also referred to as density on the data) is executed (S130 in FIG. 3). As a result, by increasing the density on the data, the reduction in the density of the printed image caused by the smaller size of the dots can be canceled out, thereby suppressing the reduction in the density of the printed image actually printed. Therefore, it is possible to suppress the difference in density between the printed image printed when the height of the liquid surface IS is less than the reference height Hth and the printed image printed when the height of the liquid surface IS is higher than the reference height Hth.

In the present embodiment, the vent OP2 is opened and closed (S145, S150), before printing, so that the in-container atmospheric pressure is set to the atmospheric pressure. According to this configuration, the in-container atmospheric pressure decreases as the volume of the air layer Ar increases due to the consumption of the ink Ik by printing since the vent OP2 is closed during printing. However, if the amount of printing in one printing process is not excessively large, the effect of the decrease in the in-container atmospheric pressure is considered to be small.

Further, the adjustment process in the above embodiment is a process of compensating the CMYK values by using the count values CV (S120 to S135) after the color conversion process (S115 in FIG. 4). Since the component values of the CMYK values correspond to the CMYK inks Ik, it is easy to selectively compensate for the color of the ink Ik of which the height of the liquid surface IS is less than or equal to the reference height Hth. Thus, the print data can be adjusted appropriately according to the height of the liquid surface IS of the ink Ik.

Further, according to the above embodiment, the adjustment of the print data is performed for each of the CMYK colors. For example, the ink information includes first information (e.g., the count value CVc for cyan) correlated with the height of the liquid surface IS of a first ink (e.g., the cyan ink), and second information (e.g., the count value CVm for magenta) correlated with the height of the liquid surface IS of a second ink (e.g., the magenta ink). The adjustment process includes a process of adjusting the data (e.g., cyan component values) of the first color of the print data according to the first information and a process of adjusting the data (e.g., magenta component values) of the second color of the print data according to the second information (S120 to S135 in FIG. 3). The height of the liquid surface IS of the ink container 151 depends on the consumption of the ink Ik and is different from each other among the CMYK colors. In the above embodiment, since the adjustment of the density corresponding to the height of the liquid surface IS is performed for each of the CMYK colors, fluctuation of the density and/or color in the color printing performed with use of multiple colors due to the difference in the height of the liquid surface IS of each ink Ik can be appropriately suppressed.

Further, in the above-described embodiment, the ink container 151 is formed with the vent OP2 that communicates between the inside and the outside of the ink container 151. According to this configuration, since the in-container atmospheric pressure can be set to the atmospheric pressure by opening the vent OP2, the effect of in-container atmospheric pressure on the pressure fluctuations imparted to the meniscus can be reduced. As a result, the degree of density adjustment when generating the print data can easily be determined, taking into account the water head pressure caused by the water head difference ΔH.

Further, in the above-described embodiment, the print engine 100 is provided with the valve 1531 for switching between a communicating state in which the inside and the outside of the ink container 151 communicate with each other via the vent OP2 and a non-communicating state in which the inside and the outside of the ink container 151 do not communicate with each other. As a result, the in-container atmospheric pressure can be set to the atmospheric pressure by setting the valve 1531 in the communicating state, while ink leakage and intrusion of foreign matter through the vent OP2 can be suppressed by setting the valve 1531 in the non-communicating state.

Still further, in the above-described embodiment, the CPU 210 controls the valve 1531 to be in the non-communicating state when the printing is being performed (S150 in FIG. 3). As a result, leakage of the ink Ik via the vent OP2 when, for example, the ink container 151 is reciprocating in the main scanning direction by the main scanning operation during printing can be suppressed.

Furthermore, the adjustment process according to the present embodiment is a process of increasing the density of the image represented by the print data in a case where the count value CV indicates that the height of the liquid surface IS is a first height (e.g., less than or equal to the reference height) in comparison with a case where the count value CV indicates that the height of the liquid surface IS is a second height (e.g., higher than the reference height). As described above, the smaller the water head difference ΔH, the smaller the amount of ink ejected, and therefore the lower the height of the liquid surface IS is, the lower the density of the image actually printed. For this reason, the lower the height of the liquid surface IS is, the higher the density of the image represented by the print data should be, and therefore, according to the present embodiment, the density of the printed image can be suppressed from fluctuating. In the present embodiment, fluctuations in the density of the printed image can be suppressed when the density of the printed image may be fluctuated easily due to fluctuations in the water head pressure.

According to the present embodiment, the ink container 151 is arranged at a position where the liquid surface IS of the ink Ik is higher than the apertures of the nozzles NZ (FIG. 2A). According to such an arrangement, the water head difference ΔH tends to be large, and therefore the density of the printed image may easily fluctuate due to fluctuations in the water head pressure.

Further, according to the present embodiment, the ink information referred to for determining the height of the liquid surface IS is the count value CV indicating the amount of the ink used for printing. As described above, the count value CV is information that is correlated with the liquid surface IS and can be accurately calculated based on the print data. For this reason, by using the count value CV as the ink information, the adjustment process can be properly executed according to the height of the liquid surface IS.

SECOND EMBODIMENT

Figure 5A:
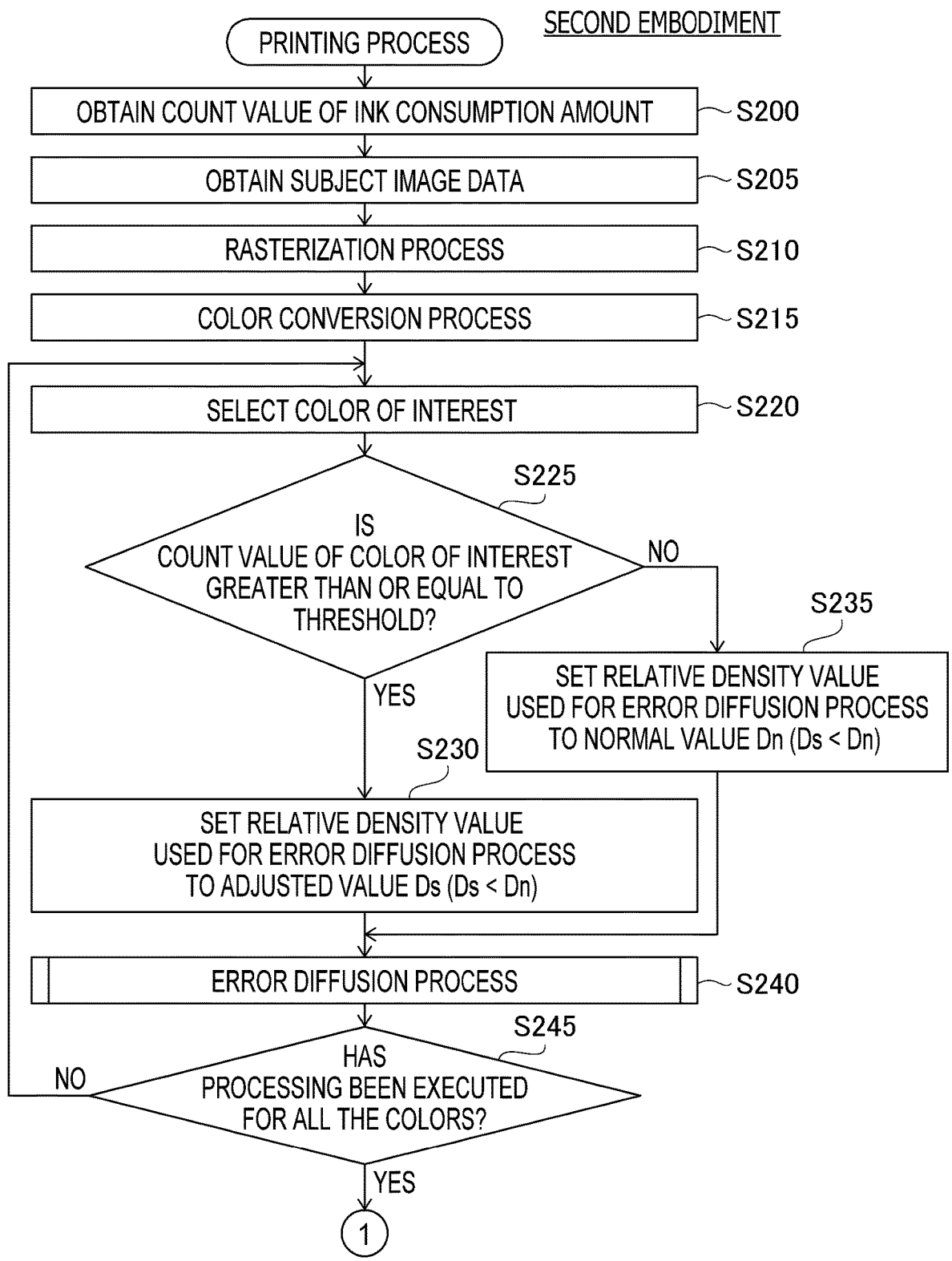
FIGS. 5A and 5B show a flowchart illustrating a printing process according to a second embodiment.
Figure 5B:
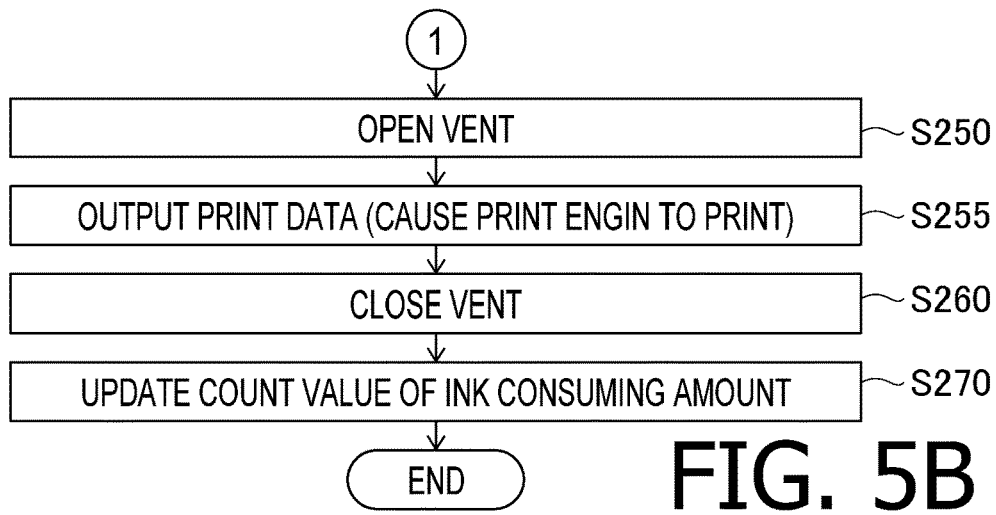

FIGS. 5A and 5B show a flowchart illustrating a printing process according to a second embodiment. In the second embodiment, instead of the printing process shown in FIG. 3, the printing process shown in FIGS. 5A and 5B is executed. It is noted that the overall configuration is substantially the same as that of the first embodiment.

S200-S225 of the printing process in FIG. 5A are identical to S100-S125 in FIG. 3, respectively. When the count value CV of the color of interest is equal to or greater than the threshold value CVth (S225: YES), the CPU 210 sets a relative density value D used in an error diffusion process (S240, described later) to a value Ds which is adjusted for the print data adjustment in S230. When the count value CV of the color of interest is less than the threshold value CVth (S225: NO), the CPU 210 sets, in S235, the relative density value D used in the error diffusion process in S240 to the normal value Dn.

In other words, when the height of the liquid surface IS of the ink Ik of the color of interest is determined to be less than or equal to the reference height Hth based on the count value CV, the relative density value D is set to the adjusted value Ds, while when the height of the liquid surface IS of the ink of the color of interest is determined to be higher than the reference height Hth, the relative density value D is set to the normal value Dn.

In S240, the CPU 210 executes the error diffusion process on the component values of the color of interest in the CMYK image data to generate the dot data of the color of interest.

Figure 6:
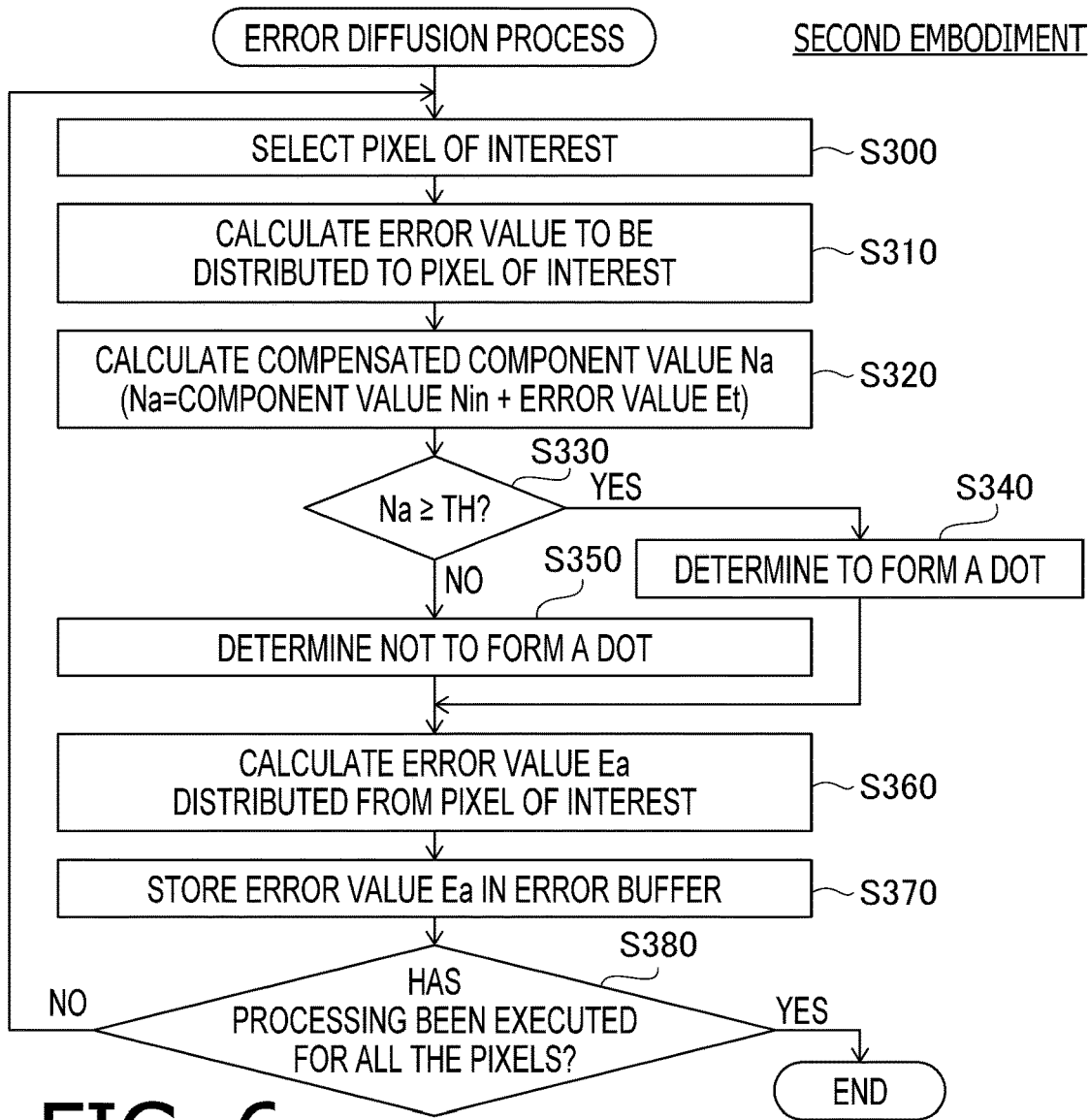
FIG. 6 is a flowchart illustrating an error diffusion process.

FIG. 6 is a flowchart illustrating the error diffusion process. In S300, the CPU 210 selects a pixel of interest. The CMYK image data represents an image which is composed such that multiple pixels are arranged in matrix, in a vertical direction and a horizontal direction. The CPU 210, for example, sequentially selects the pixel of interest one pixel at a time along the horizontal direction. When processing of one pixel line extending in the horizontal direction is completed, the CPU 210 selects another vertically adjacent pixel lines and selects the pixel of interest one pixel at a time in the same manner.

In S310, the CPU 210 calculates an error value Et to be distributed to the pixel of interest. For a processed pixel, an error value Ea distributed from the pixel has already been calculated (S370, described later), and the error value is stored in an error buffer. The CPU 210 calculates a weighted sum of the error values Ea distributed from the source pixels located around the pixel of interest as the error value Et. The distribution source pixels and weights are defined, for example, by a known error matrix (not shown).

In S320, the CPU 210 calculates a compensated component value Na of the pixel of interest. The compensated component value Na is a sum of a component value Nin of the color of interest among the CMYK values of the pixel of interest and the error value Et (i.e., Na=Nin+Et).

In S330, the CPU 210 determines whether the compensated component value Na is equal to or greater than a particular threshold TH (e.g., 255). When the compensated component value Na is greater than or equal to the threshold value TH (S330: YES), in S340, the CPU 210 determines that a dot is to be formed for the pixel of interest. That is, the value of the pixel of interest in the dot data (also called dot value) is determined to be the value indicating that a dot is to be formed. When the compensated component value Na is less than the threshold value TH (S330: NO), at S350, the CPU 210 determines not to form a dot for the pixel of interest. That is, the dot value of the pixel of interest is determined to be a value indicating that no dot is to be formed.

In S360, the CPU 210 calculates the error value Ea to be distributed from the pixel of interest to the other pixels in the image. If the dot value of the interest pixel is determined to be a value indicating that no dot is to be formed, the error value Ea is the compensated component value Na (Ea=Na). When the dot value of the pixel of interest is determined to be a value indicating that a dot is to be formed, the error value Ea is a value calculated such that the relative density value D is subtracted from the compensated component value Na (Ea=Na−D).

As the relative density value D, the value Ds or Dn already determined in S230 or S235 for the color of interest as described above is used. The highly adjusted relative density value Ds is a value smaller than the normal relative density value Dn as described above. For example, when the normal relative density value Dn is in S255, the adjusted relative Ds is about 230 to 250. When the adjusted relative density value Ds is used, the error value Ea becomes larger in comparison to a case where the normal relative density value Dn is used. In S370, the CPU 210 stores the calculated error value Ea in the error buffer.

In S380, the CPU 210 determines whether all the pixels in the CMYK image data have been processed as the pixel of interest. If there are unprocessed pixels (S380: NO), the CPU 210 returns to S300. When all the pixels have been processed (S380: YES), the CPU 210 terminates the error diffusion process.

As described above, when the adjusted relative density value Ds is used, the error value Ea is larger in comparison with the case where the normal relative density value Dn is used, and therefore, the probability that a dot is formed for the color of interest is higher and the number of dots formed is greater. Therefore, when the adjusted relative density value Ds is used, the print quality is higher in comparison to the case where the normal relative density value Dn is used, and the data density of the image represented by the print data can be increased compared to the case where the normal relative density value Dn is used.

After the error diffusion process is completed, the CPU 210 determines, in S245, whether all the CMYK colors have been processed as the color of interest, as in S135 of FIG. 3. When there are unprocessed colors (S245: NO), the CPU 210 returns to S220. When it is determined that all the colors have been processed (S245: YES), the CPU 210 proceeds to S250. At this stage, the dot data has been generated for four colors of the CMYK.

In S250, as in S145 of FIG. 3, the CPU 210 controls the valve mechanism 153 to open the vent OP2 of the ink container 151, which has been closed by the valve 153. As a result, the inside and the outside of each ink container 151 communicate with each other, thereby the pressure in the air layer Ar of each ink contaiteter 151 becoming the atmospheric pressure.

In S255, as in S155 in FIG. 3. the CPU 210 outputs the print data to the print engine 100 to have the print engine 100 execute printing.

In S260, as in S150 in FIG. 3. the CPU 210 controls the valve mechanism 153 to close the vent OP2, which was opened in S250, with the valve 1531. In the second embodiment, the vent OP is closed after the printing has been executed. Therefore, different from the first embodiment, the printing is executed in a state where the inside and the outside are communicated with each other.

In S270, as in S160 of FIG. 3. the CPU 210 updates each count value CV of the CMYK colors recorded in the non-volatile storage device 220, and terminates the printing process.

According to the present embodiment described above, the error diffusion process is performed as the halftone process (S240 in FIG. 5A). The error diffusion process is performed such that if the count value CV indicates that the height of the liquid surface IS is the first height (concretely, the reference height Hth), the error diffusion process is executed using the first parameter (concretely, the adjusted relative density value Ds), while if the count value CV indicates that the height of the liquid surface IS is a second height different from the first height (concretely, a height higher than the reference height Hth), the error diffusion process is performed using a second parameter different from the first parameter (concretely, the normal relative density value Dn) (S225-S235 in FIG. 5A). As a result, the halftone process is executed using different parameters depending on the height of the liquid surface IS of the ink Ik, therefore the density of the image indicated by the print data can be adjusted appropriately according to the height of the liquid surface IS of the ink Ik.

Concretely, as in the first embodiment, if the height of the liquid surface IS is higher than the first height (concretely, the height less or equal to the reference height Hth), in comparison with a case where the height of the liquid surface IS is higher than the second height (concretely, the height higher than the reference height Hth), the density on the data of the image represented by the print data can be increased. In addition, since the halftone process is performed for each color of the CMYK inks Ik used for printing, it is easy to selectively compensate for the color of ink Ik for which the height of the liquid surface IS is less than or equal to the reference height Hth.

Further, according to the present embodiment, unlike the first embodiment, during a period when the print engine 100 executes printing, the CPU 210 controls the valve 1531 to be in the communicating state (S250 in FIG. 5B). As a result, the in-container atmospheric pressure is maintained at the atmospheric pressure during printing. As a result, regarding the fluctuations in the pressure applied to the meniscus, only the water head pressure caused by the water head difference ΔH is to be considered, which makes it easy to adjust the printing data.

THIRD EMBODIMENT

Figure 7:
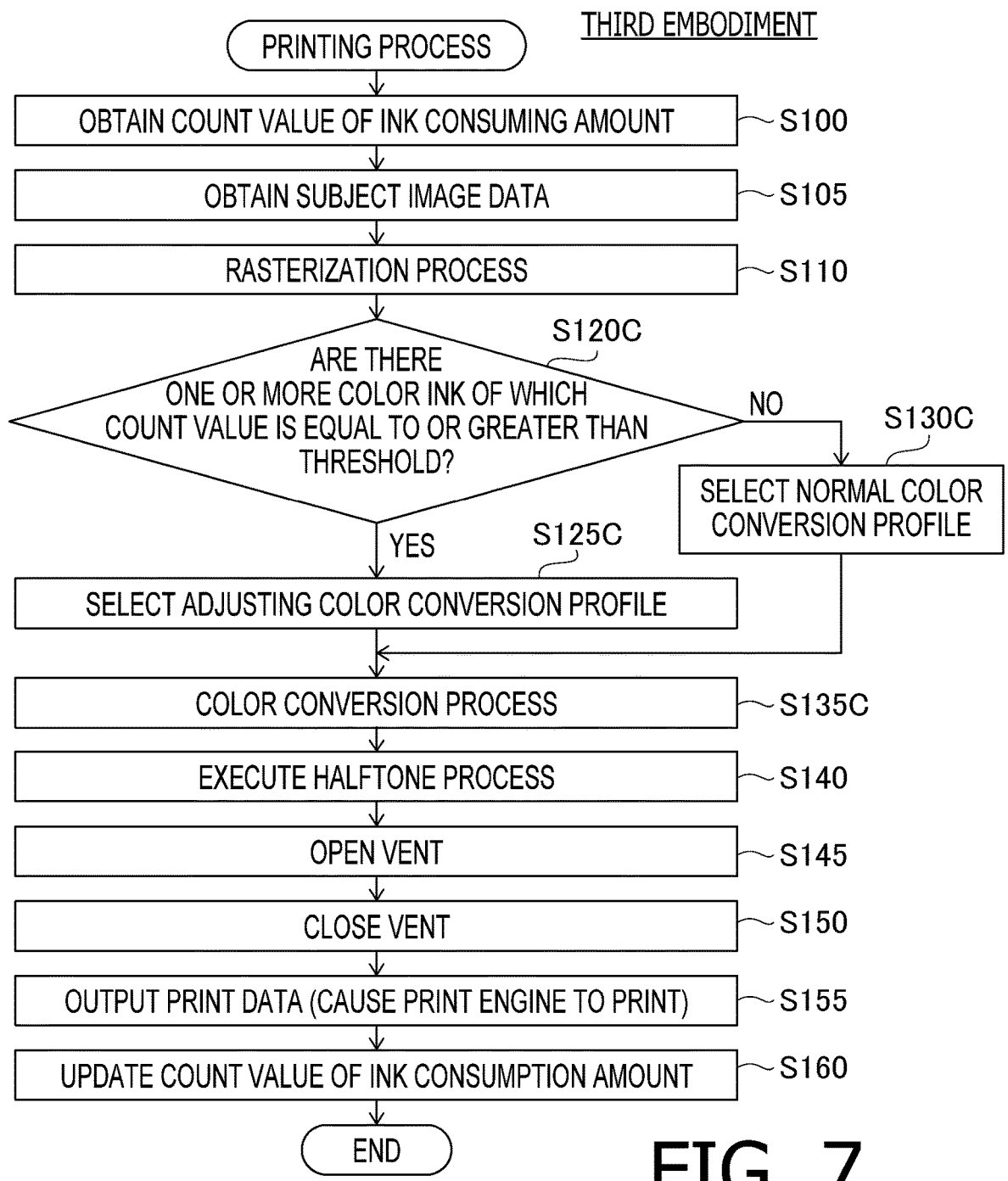
FIG. 7 is a flowchart illustrating a printing process according to a third embodiment.

FIG. 7 shows a flowchart illustrating a printing process according to a third embodiment. In the third embodiment, instead of the printing process shown in FIG. 3, a printing process shown in FIG. 7 is executed. The other configurations of the third embodiment are the same as those of the first embodiment. In the flowchart shown in FIG. 7, processes identical to those in the flowchart in FIG. 3 are assigned with the same references as in FIG. 3, and processes different from those in the flowchart shown in FIG. 3 are indicated by a letter "C" is appended at the end of the step numbers.

The processes S100-S110 in FIG. 7 are the same as those in S100-S110 in FIG. 3. In S120C after S110 in FIG. 7, the CPU 210 determines whether there exist one or more color inks Ik of which count value CV is equal to or greater than the threshold value TH.

If there is no ink Ik of which the count value CV is greater than or equal to the threshold value TH (S120C: NO), then, in S130C of FIG. 7, the CPU 210 selects the normal color conversion profile. The normal color conversion profile is the same as the color conversion profile used in the color conversion process according to the first embodiment (S115 in FIG. 3). In other words, when the height of the liquid surface IS of all the containers 151 is higher than the reference height Hth, the normal color conversion profile (also referred to as a normal profile) is selected.

When there are one or more inks Ik of which count value CV is greater than or equal to the threshold TH (S120C: YES), the CPU 210 selects a color conversion profile (which is also referred to as an adjusting profile) in S125C of FIG. 7. The adjusting profile is a look-up table having a similar data structure as the normal profile. The adjusting profile converts at least part of the RGB values to CMYK values, which represent a higher density of color than when the normal profile is used. In other words, when the height of the liquid surface IS of at least one ink container 151 is less than or equal to the reference height Hth, the adjusting profile is selected.

FIG. 8 illustrates selection of the color conversion profiles. As shown in FIG. 8, there is only one normal profile, but fifteen adjusting profiles are available. The sixteen color conversion profiles are created in advance and stored in the non-volatile storage device 220 together with the computer program PG.

Assuming that each of the CMYK inks Ik is either in the "high" or "low" state, all combinations of the states of the CMYK inks Ik (i.e., 16 combinations) are shown in FIG. 8. The C ink is "high" means that the height of the liquid surface IS of the C ink is higher than the reference height Hth, while the C ink is "low" means that the height of the liquid surface IS of the C ink is less than the reference height Hth. Each of the 16 color conversion profiles is associated with one of the 16 combinations.

In S125C of FIG. 7, one profile is selected from among 15 adjusting profiles, depending on whether each of the four inks Ik is in the "high" or "low" state. For example, when the C ink is "low" and the MYK inks Ik are "high," the adjusting profile 1 is selected. With the adjusting profile 1, the RGB values indicating colors to be printed using the C ink among all the RGB values are converted to the CMYK values indicating colors with higher density than when the normal color conversion profile is used.

Further, by using the adjusting profile 1, all the RGB values, which indicate the colors to be printed without using C ink, are converted to the CMYK values, which indicate the same colors as when the normal color conversion profile is used. When the two inks of MY are in the "low" state and the two inks of CK are in the "high" state, the adjusting profile 8 is selected. According to the adjusting profile 8, among all the RGB values, at least the RGB values indicating color to be printed using al least one of the MY inks are converted to the CMYK values which indicate colors with higher density than when the normal color conversion profile is used.

On the other hand, according to the adjusting profile 8, among all the RGB values, at least the RGB values indicating color to be printed without using the M ink or the Y inks are converted to the CMYK values which indicate the same colors as when the normal color conversion profile is used.

In S135C of FIG. 7, the CPU 210 performs the color conversion process using the color conversion profile selected in S125C or S130C. Then, the RGB image data is converted to the CMYK image data.

The processes of S140-S160 in FIG. 7 are the same as processes in FIG. S140-S160 in FIG. 3.

According to the present embodiment, when the count value CV indicates that the height of the liquid surface IS is the first height (concretely, the reference height Hth or less), the color conversion process is performed using the first color conversion profile (specifically, the adjusting profile), while, when the count value CV indicates that the height of the liquid surface IS is the second height (concretely, higher than the reference height Hth), the color conversion process is performed using the second color conversion profile (specifically, the normal profile) which is different from the first color conversion profile (S120C-S130C of FIG. 7). As a result, the color conversion process is executed using different color conversion profiles according to the height of the liquid surface IS of ink Ik, and therefore the density of the image indicated by the print data can be adjusted appropriately according to the height of the liquid surface IS of the ink Ik.

In the above embodiment, one adjusting profile is selected from among a plurality of adjusting profiles prepared for combinations indicating whether or not the height of the liquid surface IS of each ink Ik is less than or equal to the reference height Hth (FIG. 8). As a result, the color of the ink Ik of which the height of the liquid surface IS is less than or equal to the reference height Hth can be selectively compensated.

FOURTH EMBODIMENT

FIG. 9 is a flowchart illustrating a printing process according to a fourth embodiment. In the fourth embodiment, the printing process shown in FIG. 9 is executed instead of the printing process shown in FIG. 3. The other configurations of the fourth embodiment are identical to those of the first embodiment. In the flowchart shown in FIG. 9, the same processes as in the flowchart in FIG. 3 are indicated by the same step numbers as in FIG. 3, while the processes that differ from the processes in the flowchart in FIG. 3 are indicated by appending a letter "D" at the end of the step numbers.

The processes of S100-S110 of FIG. 9 and the processes of FIG. S100-S110 in FIG. 3 are identical. In S115D after S110 of FIG. 9, the CPU 210 determines whether or not there are inks Ik of which count value CV is greater than or equal to the threshold TH from among the CMYK inks.

When there is one or more inks Ik of which count value CV is greater than or equal to the threshold TH (S115D: YES), the CPU 210 selects compensating profile in S120D of FIG. 9. The compensating profile is a profile defining the correspondence between the RGB values before compensation and the RGB value after the compensation, and is, for example, a look-up table. By using the correction profile, at least some RGB values are converted to RGB values that indicate higher density colors. In other words, when the height of the liquid surface IS of at least one ink container (container) 151 is less than or equal to the reference height Hth, the compensating profile is selected.

Similar to the adjusting profiles according to the third embodiment, assuming that each of the CMYK inks Ik is either in the "high" or "low" state, fifteen compensating profiles respectively corresponding to fifteen combinations of the states of the CMYK inks Ik are prepared in advance and are stored in the non-volatile storage device 220 together with the computer program PG.

In S120D of FIG. 9, one profile is selected from among the 15 compensating profiles, depending on whether each of the four inks Ik is in the "high" or "low" state. For example, when the C ink is "low" and the MYK inks Ik are "high", a profile with which the RGB values indicating colors to be printed using the C ink are converted to the CMYK values indicating colors with higher density than when the normal color conversion profile is used is selected.

When the MY inks are in the "low" state and the CK inks are in the "high" state, a compensating profile with which at least the RGB values, among all the RGB values, indicating color to be printed using al least one of the MY inks are converted to the CMYK values which indicate colors with higher density than when the normal color conversion profile is used is selected.

In S130D of FIG. 9, the CPU 210 uses the compensating profile selected 120D to compensate the RGB values of each pixel in the RGB image data.

When there is not a single ink Ik with the count value CV greater than or equal to the threshold value TH (S115D: NO), S1, 20D and S130D of FIG. 9 are skipped. In other words, when the height of the liquid surface IS of all inks Ik can be determined to be higher than the reference height Hth, no compensation is performed on the RGB image data.

In S135D of FIG. 9, the CPU 210 performs the color conversion process on the RGB image data as in S115 of FIG. 3. In this way, the RGB image data is converted to the CMYK image data.

The process in S140-S160 of FIG. 9 and the process in S140-S160 of FIG. 3 are identical.

According to the present embodiment described above, the adjustment process according to the height of the liquid surface IS is a process of compensating the color values (i.e., RGB values) of the RGB color system using the count values CV (S115D-S130D of FIG. 9) before executing the color conversion process (S135D of FIG. 9). As a result of the above process, the color values of the RGB color system are compensated using the count values CV, and therefore, the density of the image represented by the image data can be appropriately adjusted in accordance with the height of the ink surface IS.

In the above embodiment, similar to the third embodiment, one compensating profile is selected from among a plurality of compensating profiles prepared for combinations indicating whether or not the height of the liquid surface IS of each ink Ik is less than or equal to the reference height Hth (FIG. 8). As a result, the color of the ink Ik of which the height of the liquid surface IS is less than or equal to the reference height Hth can be selectively compensated.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Figure 10:
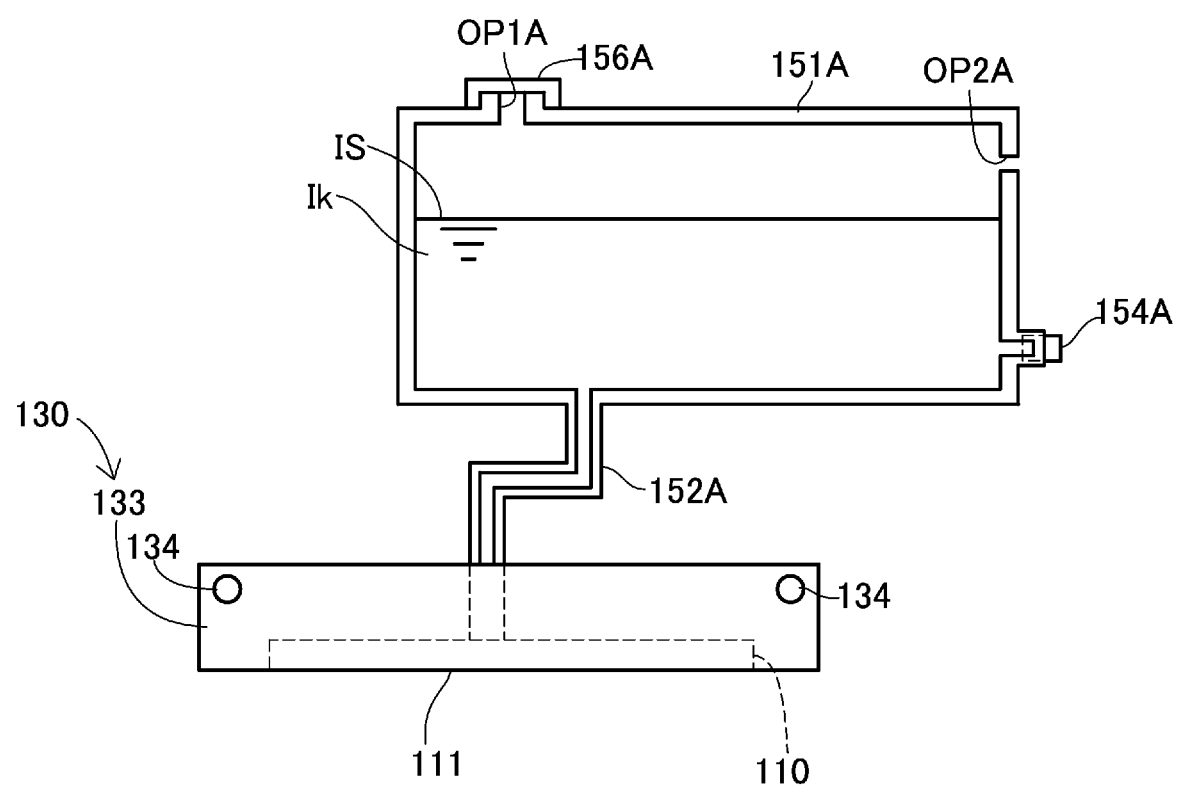
FIG. 10 shows a configuration of an ink container according to a first modification.

FIG. 10 shows a configuration of an ink container according to a modification. In the above-described embodiments, the ink container 151 are mounted on the carriage 133. However, the configuration according to the present disclosures is not necessarily limited to such a configuration. An ink container 151A in FIG. 10 is not mounted on the carriage 133, but is installed in a particular position in a housing of the printer 200, for example. The ink container (container) 151A in FIG. 10 and the print head 110 are connected via an ink channel 152A. The ink in the ink container 151A is supplied to the print head 110 via the ink channel 152A.

The ink container 151A is formed with, similar to the ink container 151 shown in FIG. 2A, an inlet OP1A and a vent OP2A, and a liquid surface sensor 154A is also provided. Further, similar to the inlet OP1 of the ink container 151 shown in FIG. 2A, a detachable lid 156A is attached to the inlet OP1A.

On the ink container 151A shown in FIG. 10, no valve mechanism is provided at a position where the vent OP2A is formed. As in this modification, the valve mechanism for opening/closing the vent OP2A may be omitted. In this case, the inside and the outside of the ink container 151A always communicate with each other.

The entire ink container (container) 151A in FIG. 10 is located at a position higher than apertures of the nozzles NZ of the print head 110. Therefore, the height of the liquid surface IS of the ink container 151A is always higher than the apertures of the nozzles NZ.

Figure 11:
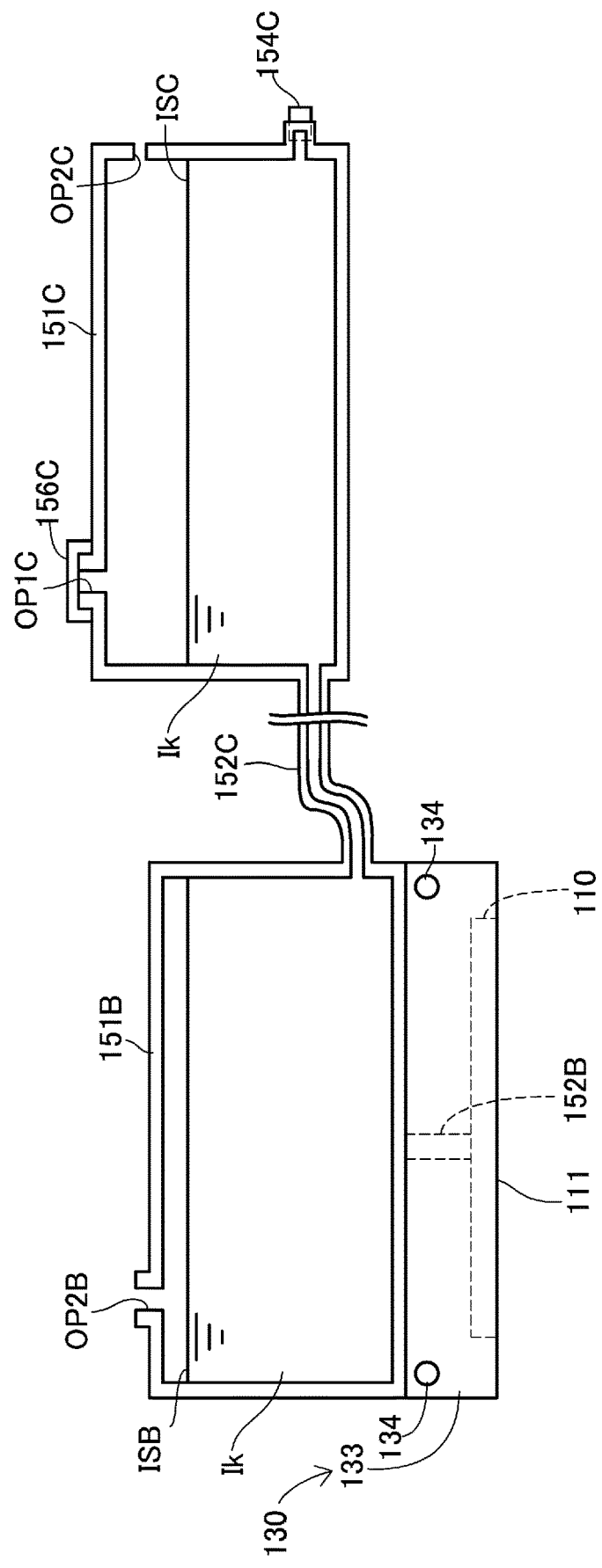
FIG. 11 shows a configuration of an ink container according to a second modification.

FIG. 11 shows ink containers according to another modification. In the above-described embodiments, the print engine 100 is provided with a single ink container 151. However, the configuration of the print engine is not necessarily limited to such a configuration. In the modification shown in FIG. 11, the print engine is provided with two ink containers 151B and 151C.

The ink container 151B is mounted on the carriage 133. The ink container 151B and the print head 110 are connected via an ink channel 152B. the ink Ik contained in the ink container 151B is supplied to the print head 110 via the ink channel 152B.

The ink container 151C is not mounted on the carriage 133, but disposed to a particular position of the housing of the printer 200. The ink container 151C and the ink container 151B are connected via a ink channel 152C. the ink Ik contained in the ink container 151C is supplied to the ink container 151B via the ink channel 152C.

A vent OP2B is formed on the ink container 151B, and a vent OP2C is formed on the ink container 151C. Accordingly, the in-container atmospheric pressure of the ink container 151B and the in-container atmospheric pressure of the ink container 151C are both atmospheric pressure. As a result, a liquid surface ISB of the ink Ik in the ink container 151B and a liquid surface ISC of the ink Ik in the ink container 151C are at the same height.

The ink container 151C is formed with an inlet OP1C similar to the ink container 151 shown in FIG. 2A, and a liquid surface sensor 154C is also provided. Further, similar to the inlet OP1 of the ink container 151 shown in FIG. 2A, a detachable lid 156C is attached to the inlet OP1B.

At portions of the containers 151B and 151C where the vents OP2B and OP2C are formed, no valve mechanism is provided. Therefore, the inside and outside of each of the containers 151A and 151C always communicate with each other.

The entire ink container 151B and the entire ink container 151C are located at higher positions than the apertures of the nozzles NZ of the print head 110. Therefore, the heights of the liquid surfaces ISA and ISB of the ink containers 151B and 151C are always higher than the apertures of the nozzles NZ.

In each of the above embodiments, the ink information is the count value CV of ink consumption, but the ink information is not necessarily limited to the count value CV. The ink information may be, for example, information indicating the amount of ink remaining in the ink container 151. The information indicating the remaining amount of the ink can be calculated easily using, for example, the count value CV.

The ink information may be the result of detection using a liquid surface sensor. For example, a liquid surface sensor similar to the liquid surface sensor 154 shown in FIG. 2A may be attached at the reference height Hth. Then, with use of the detection result of the liquid surface sensor, whether or not the liquid surface IS is less than or equal to the reference height Hth.

In each of the above embodiments, a process to increase the density on the data of the image represented by the print data is performed as the adjustment process. The adjustment process is not necessarily limited to this but, for example, an adjustment process to adjust the hue on the image data without changing the density may be executed. For example, when the liquid surface IS of the C ink Ik is less than or equal to the reference height Hth and the liquid surface IS of each of the MYK inks is higher than the reference height Hth, the C dots will be smaller than the MYK dots in the image to be printed, and the hue of the image to be printed may fluctuate. Therefore, a process to adjust the hue of the image represented by the print data may be executed as an adjustment process to cancel out the fluctuation of the hue of the image to be printed.

In each of the above embodiments, the adjustment of density according to the height of the liquid surface of the ink is made at two levels: when the liquid surface IS is below the reference height Hth (with adjustment), and when the liquid surface IS is higher than the reference height Hth (no adjustment). The above configuration may be modified such that multiple (e.g., three or more steps of) adjustments may be made.

For example, when the liquid surface IS is higher than a reference height Hth1, an adjustment to lower the density is performed, when the liquid surface IS is less than or equal to the reference height Hth1 and greater than or equal to a reference height Hth2, no density adjustment is performed, and when the liquid level IS is less than or equal to the reference height Hth2, an adjustment to increase the density may be executed.

In each of the above embodiments, the obtaining of the count value CV is performed only once per one print process, i.e., per one print job, to determine whether the density should be adjusted or not. Such a configuration can be modified such that, for example, the count value CV may be obtained every time printing is performed for n pages (n is an integer greater than or equal to 1), or It may be obtained at every execution of n partial prints (passes). Then, whether or not the density adjustment is to be performed is determined every time when the count value CV is obtained.

In the second embodiment above (FIGS. 5A, 5B and FIG. 6), the error diffusion process is executed as the halftone process. The parameter used in the error diffusion process, depending on the height of the liquid surface IS, is the relative density value. Alternatively, a dither process may be performed as the halftone process. In such a case, the parameter used in the error diffusion process, depending on the height of the liquid surface IS, is a threshold value defined in a dither matrix.

For example, when the liquid surface IS is less than or equal to the reference height Hth, a dither matrix with a smaller threshold value is used compared to the case where the liquid level IS is higher than the reference height Hth. Even in such a case, similar to the second embodiment, when the liquid surface IS is less than or equal to the reference height Hth, the density on the data of the image represented by the print data can be made higher compared to the case where the liquid surface IS is higher than the reference height Hth.

In the above embodiments, the print engine 100 is configured to perform printing using the inks Ik of four colors (i.e., CMYK). The configuration may be modified such that the print engine may perform printing using only K ink Ik, or CMY inks Ik, or more than 4 colors of inks Ik. In whatever case, it is preferable that, for each ink Ik, whether or not the height of the liquid surface IS is less than or equal to the reference height Hth is determined, and the color density of the ink Ik is adjusted based on the result of the determination.

In each of the above embodiments and modifications, the entirety of the ink Ik contained in the ink container 151 is located at a position higher than the apertures of the nozzles NZ (FIG. 2A, FIG. 10, FIG. 11). Alternatively, the entirety or a portion of the ink Ik contained in the ink container may be located at a position lower than the apertures of the nozzles NZ. It should be noted that when the liquid surface is lower than the nozzles NZ, the ink pressure at the nozzle apertures is negative, while, when the liquid surface is higher than the nozzle apertures, the ink pressure at the nozzle apertures is positive. In other words, the ink output of the ink varies depending on the position of the liquid surface, including when the liquid surface is lower than the nozzles NZ.

However, it is preferable that the ink container should be positioned such that when the maximum amount of the ink Ik is contained in the ink container 151, at least the liquid surface IS of the ink Ik is located at a position higher than the apertures of the nozzles NZ. In such a case, it is highly significant to adjust the density according to the height of the liquid surface IS, since the fluctuation of ejection amount of the ink Ik increases due to the effect of the water head difference ΔH.

In each of the above embodiments, the ink container (container) 151 is fixed to the carriage 133 and the ink is refilled by injecting ink through the inlet OP1. Alternatively, the ink container 151 may be configured to be removable from the carriage 133. In such a case, refilling of the ink Ik is done by replacing the ink container with a new ink container that contains the ink Ik inside.

In the first, third, and fourth embodiments, a control to execute printing with the atmospheric vent closed is employed, while in the second embodiment, a control to execute printing with the atmospheric vent open is employed. However, the configuration is not necessarily limited to the above, and any of the embodiments can adopt both the control to execute printing with the atmospheric vent closed and the control to execute printing with the atmospheric vent open.

The print engine 100 may include a so-called line printer. For example, the print engine does not have the main scanning mechanism 130, and the print head 110 may have a nozzle group for each color including multiple nozzles lined up in a direction orthogonal to the sheet conveying direction. Such a print head 110 is also referred to as a line head. The multiple nozzles in each nozzle group are aligned over a length roughly equal to the width of the sheet. Line printers execute printing without a main scanning.

The printing process in each embodiment may be executed by a CPU of a terminal device connected to the printer (e.g., by a CPU of the user's smartphone or personal computer) instead of the CPU 210 of the printer 200. In such a case, the CPU of the terminal device functions as a printer driver by executing, for example, a computer program provided by the manufacturer of the printer. The CPU of the terminal device then executes the printing process for each embodiment as the printer driver. In such a case, the CPU of the terminal device obtains the ink information, such as the count value CV, from the printer by inquiring with the printer.

The device that performs the printing process in each embodiment may be, for example, a server that obtains image data from a printer or a terminal device and generates print data using the image data. Such servers may be multiple computers that can communicate with each other via a network (i.e., so-called cloud servers).

In each of the above embodiments, a part of the configuration realized by hardware may be replaced with software, or conversely, a part or all of the configuration realized by software may be replaced with hardware. For example, when the printing process in FIG. 3 is executed on the printer 200, the halftone or color conversion process may be performed by a dedicated hardware circuit (e.g., an ASIC) that operates according to the instructions of the CPU 210 of the printer 200.

The above description of the embodiments and modifications is intended to facilitate understanding of aspects of the present disclosures, and is not intended to limit the same. Aspects of the present disclosures may be modified and/or improved without departing from the intent and scope of the claims, and the invention set forth in claims includes equivalents thereof.

What is claimed is:

1. A printing device, comprising:
   a print head having a plurality of nozzles configured to eject ink droplets therefrom;
   a supplier configured to supply ink contained in a container to the print head; and
   a controller,
   wherein the controller is configured to perform:
   obtaining ink information indicative of a height of a liquid surface of the ink contained in the container with respect to an aperture of the nozzles;
   comparing the obtained ink information with preset ink information, the preset ink information being indicative of a defined height of the liquid surface of the ink with respect to the aperture of the nozzles;
   obtaining subject image data representing an image to be printed;
   generating print data based on the subject image data; and
   causing the print head to eject ink droplets based on the print data,
   the generating including adjusting the print data in accordance with the comparing.

2. The printing device according to claim 1, wherein
   the subject image data is image data indicating a color of each pixel by a color value according to a first color system;
   the adjusting includes converting the color value according to the first color system to a color value according to a second color system including multiple components corresponding to multiple inks used for printing; and
   the converting includes converting using:
   a first color conversion profile when the comparing has a first comparison result; and
   a second color conversion profile different from the first color conversion profile when the comparing has a second comparison result different from the first comparison result.

3. The printing device according to claim 1, wherein:
   the subject image data is image data indicating a color of each pixel in accordance with a first color system;
   the generating includes converting a color value in accordance with the first color system to a color value according to a second color system including multiple components corresponding to multiple inks used for printing; and
   the adjusting includes compensating the color value in accordance with the first color system based on the comparing before the converting the color.

4. The printing device according to claim 1, wherein:
the subject image data is image data indicating a color of each pixel in accordance with a first color system;
the generating includes converting a color value in accordance with the first color system to a color value according to a second color system including multiple components corresponding to multiple inks used for printing; and
the adjusting compensates the color value according to the second color system based on the comparing before the converting.

5. The printing device according to claim 1, wherein:
the subject image data is image data indicating a color for each pixel by a color value according to a second color system that includes multiple components corresponding to multiple inks used for printing by a print engine;
the adjusting includes a halftone process of converting the subject image data to dot data indicating a dot formation status of each pixel;
the halftone process is executed using:
  a first parameter when the comparing has a first comparison result; and
  a second parameter different from the first parameter when the comparing has a second comparison result different from the first comparison result.

6. The printing device according to claim 1, wherein:
the supplier is configured to supply first color ink contained in a first container and a second color ink contained in a second container to the print head;
the print head having first nozzles configured to eject the first color ink and second nozzles configured to eject the second color ink;
the ink information includes first information indicative of the height of the liquid surface of the first color ink contained in the first container with respect to an aperture of the first nozzles, and second information indicative of the height of the liquid surface of the second color ink contained in the second container with respect to an aperture of the second nozzles; and
the adjusting includes:
  first adjusting data regarding a first color of the print data in accordance with the height of the liquid surface of the first color ink based on the first information; and
  second adjusting data regarding a second color of the print data in accordance with the height of the liquid surface of the second color ink based on the second information.

7. The printing device according to claim 1, wherein the container has a communication opening communicating between an inside and an outside of the container.

8. The printing device according to claim 7, further comprising a valve configured to open and close the communication opening to switch between a communicating state in which the inside and the outside of the container communicate and a non-communicating state in which the inside and the outside of the container do not communicate.

9. The printing device according to claim 8, wherein the controller is configured to control the valve to be in the non-communicating state during a period in which printing is being executed.

10. The printing device according to claim 8, wherein the controller is configured to control the valve to be in the communicating state during a period in which printing is being executed.

11. The printing device according to claim 1, wherein the adjusting is increasing density of an image represented by the print data when the ink information indicates that the height of the liquid surface is a first height, in comparison with a case where the ink information indicates that the height of the liquid surface is a second height which is higher than the first height.

12. The printing device according to claim 1, wherein the container is arranged at a position where a height of a liquid surface of the ink is higher than apertures of the nozzles in a state where a maximum amount of the ink is contained in the container.

13. The printing device according to claim 1, wherein the ink information indicative of the height is a count value indicating an amount of ink used for printing.

14. A non-transitory computer-readable recording medium for a printing device having a print head having a plurality of nozzles configured to eject ink droplets therefrom, a supplier configured to supply ink contained in a container to the print head, and a controller,
wherein the non-transitory computer-readable recording medium contains computer-executable instructions which cause, when executed by the controller, the printing device to perform:
obtaining ink information indicative of a height of a liquid surface of the ink contained in the container with respect to an aperture of the nozzles;
comparing the obtained ink information with preset ink information, the preset ink information being indicative of a defined height of the liquid surface of the ink with respect to the aperture of the nozzles;
obtaining subject image data representing an image to be printed;
generating print data based on the subject image data; and
causing the print head to eject ink droplets based on the print data,
wherein the generating includes adjusting the print data in accordance with the comparing.

15. A printing device, comprising:
a print head having a plurality of nozzles configured to eject ink droplets therefrom;
a supplier configured to supply ink contained in a container to the print head; and
a controller,
wherein the controller is configured to perform:
obtaining ink information indicative of a height of a liquid surface of the ink contained in the container with respect to an aperture of the nozzles;
comparing the obtained ink information with preset ink information, the preset ink information being indicative of a defined height of the liquid surface of the ink with respect to the aperture of the nozzles;
obtaining subject image data representing an image to be printed;
generating print data based on the subject image data; and
causing the print head to eject ink droplets based on the print data,
wherein the generating includes adjusting the print data, based on the comparing, such that the lower the height of the liquid surface of the ink is, the more an ejection amount of the ink is.

* * * * *